(12) United States Patent
Van Der Velden et al.

(10) Patent No.: US 8,035,354 B2
(45) Date of Patent: Oct. 11, 2011

(54) BATTERY FULL-CHARGE DETECTION FOR CHARGE-AND-PLAY CIRCUITS

(75) Inventors: Frank P. A. Van Der Velden, Berghem (NL); Dirk Groeneveld, Elst (NL)

(73) Assignee: ST-Ericsson SA, Geneva (CH)

( * ) Notice: Subject to any disclaimer, the term of this patent is extended or adjusted under 35 U.S.C. 154(b) by 515 days.

(21) Appl. No.: 12/097,690

(22) PCT Filed: Dec. 12, 2006

(86) PCT No.: PCT/IB2006/054767
§ 371 (c)(1),
(2), (4) Date: Jun. 16, 2008

(87) PCT Pub. No.: WO2007/069196
PCT Pub. Date: Jun. 21, 2007

(65) Prior Publication Data
US 2008/0315845 A1    Dec. 25, 2008

(30) Foreign Application Priority Data

Dec. 16, 2005   (EP) ................... 05112334

(51) Int. Cl.
*H02J 7/06* (2006.01)
*H02J 7/00* (2006.01)

(52) U.S. Cl. .................... 320/159; 320/128

(58) Field of Classification Search ............ 320/128, 320/159
See application file for complete search history.

(56) References Cited

U.S. PATENT DOCUMENTS

| | | | |
|---|---|---|---|
| 5,739,667 A | 4/1998 | Matsuda et al. | |
| 5,747,973 A * | 5/1998 | Robitaille et al. | 323/239 |
| 5,955,869 A * | 9/1999 | Rathmann | 320/132 |
| 6,144,187 A * | 11/2000 | Bryson | 320/137 |
| 6,169,388 B1 * | 1/2001 | Niemitalo et al. | 320/139 |
| 6,204,633 B1 | 3/2001 | Kitagawa | |
| 6,229,286 B1 | 5/2001 | Tokuyama | |
| 2002/0036482 A1 | 3/2002 | Nakatsuji | |
| 2005/0116687 A1 | 6/2005 | Yokomizo et al. | |
| 2006/0113963 A1 * | 6/2006 | Wang et al. | 320/145 |
| 2006/0226813 A1 * | 10/2006 | Lu | 320/128 |

FOREIGN PATENT DOCUMENTS

| | | |
|---|---|---|
| EP | 1 043 824 A2 | 10/2000 |
| JP | 2000078770 A | 3/2000 |
| JP | 2000299944 A | 10/2000 |
| JP | 2002058171 A | 2/2002 |
| JP | 2005341800 A | 12/2005 |
| WO | 9319508 A1 | 9/1993 |

* cited by examiner

*Primary Examiner* — M'baye Diao

(57) ABSTRACT

The present invention relates to a battery charge circuit (100) in a charge-and-play mode capable to reliably determine the completion of a battery charging operation has been described. Such a determination takes into account the behavior of the battery charge circuit (100) with respect to the temperature, the activity of the circuitry (30) and the source current limitation. Thus, a distinction can be made between a decrease of the battery charge current ICHG below the end-of-charge current level caused by the full-charge state of the battery (20) and by the activation of temperature and current regulation circuits. Furthermore, the battery charge circuit (100) is also configured such that it can be warned both that the activity of the circuitry (30) is to be limited and, by a timer (800) measuring the time interval during which the battery charge current ICHG has been reduced to zero, that the battery (20) is being discharged.

28 Claims, 4 Drawing Sheets

BATTERY FULL-CHARGE DETECTION FOR CHARGE-AND-PLAY CIRCUITS

The present invention relates to a battery charge circuit in a charge-and-play mode, and is more particularly directed to a detection configuration and method for determining the completion of a battery charging operation.

Portable and mobile devices, such as a cellular phone, digital enhanced cordless telecommunications (DECT) phone, personal digital assistant (PDA), portable personal computer, camcorder, digital camera, portable jukebox, portable storage device (e.g. USB (Universal Serial Bus) memory stick using a hard disk) or MP3 player for example, need to have their circuitry electrically supplied by an operational rechargeable battery whenever no alternative electric power source is available. When the battery is fully discharged and is therefore no longer operational, it can nevertheless be charged again by being electrically fed by a DC power source such as a wall plug adapter, USB or IEEE 1394 supply. So two charge configuration modes can be obtained: the simple charge mode wherein the device can operate only from the battery to which it is connected, and the charge-and-play mode wherein the battery of the device can be removable and is separated from the circuitry. In the former case, the user must first wait for a while until the battery is charged before using the device again, whereas in the latter case, the user can still continue using it since the DC power source simultaneously supplies the circuitry and the battery of the device. This can be illustrated, for example, by a portable computer installed in a docking station while its battery is being charged, or a PDA in a docking station inside a car, which is in use for navigation while its batteries are being charged by the car battery.

Referring to FIG. 1a-1a' and FIG. 1b, some examples of conventional battery charge circuits 100, 100' in a charge-and-play mode, as well as the corresponding graph of a typical charging profile for a rechargeable Lithium Ion (Li-ion) battery are respectively depicted.

In FIG. 1a, the DC power source 10 is a USB supply connected to the terminal USB, which delivers a source current $I_S$ split into a first current $I_{CHG}$, designated in the following as battery charge current, and a second current $I_2$, each of both being detected while passing through respective first and second current sensors 420, 430. The former current $I_{CHG}$ charges the battery 20 of the portable or mobile device connected at the terminal BAT through a first switching device 200 (e.g. field effect transistor (FET)), while the latter current $I_2$ circulates through a second switching device 210 (e.g. field effect transistor (FET)) connected between the terminals USB and SYS for simultaneously supplying the circuitry 30 at the terminal SYS, separated from the battery 20 at the terminal BAT through a diode D in a OFF-state. The play current $I_{SYS}$ which flows through the circuitry 30 will be thus equal to the second current $I_2$ as long as the diode D remains in a OFF-state. It will behave as a short-circuit in a forward mode when the voltage $V_{SYS}$ across the circuitry 30 drops until to become lower than the voltage $V_{BAT}$ across the battery 20. This voltage drop allows the battery 20 to feed the circuitry 30 with an extra current $I_{BAT}$ as soon as the activity of the circuitry 30 increases and the battery charge current $I_{CHG}$ is reduced to zero, i.e., as soon as the play current $I_{SYS}$ exceeds the maximum source current $I_{Smax}$ able to be delivered by the DC power source 10. The play current $I_{SYS}$ will be then equal to the sum $(I_2+I_{BAT})$ of the second and extra currents $I_2$ and $I_{BAT}$.

In FIG. 1a', the DC power source 10' is a wall plug adapter connected to the terminal WALL, which charges the battery 20 of the portable or mobile device at the terminal BAT' through third and fourth switching devices 200', 210' (e.g. field effect transistor (FET)) separated by the terminal SYS', while simultaneously supplying the circuitry 30 connected to the terminal SYS' and separated from the battery 20 through a diode D' in a OFF-state. The source current $I_{S'}$ delivered by the DC power source 10' flows through the fourth switching device 210' and the fourth current sensor 430' which are connected between the terminals WALL and SYS', before being split into a play current $I_{SYS'}$ and a battery charge current $I_{CHG'}$, being detected while passing through a third current sensor 420'. The play current $I_{SYS'}$ which flows through the circuitry 30 will be thus equal to the source current $I_{S'}$ minus the battery charge current $I_{CHG'}$ as long as the diode D' remains in a OFF-state, i.e., as long as the DC power source 10' can supply sufficient current to the circuitry 30. On the contrary, if the DC Power source 10' cannot supply any longer sufficient current to the circuitry 30, the diode D' will switch in a ON-state when the voltage $V_{SYS'}$ across the circuitry 30 drops below the voltage $V_{BAT'}$ across the battery 20. This voltage drop will allow the battery 20 to feed the circuitry 30 with an extra current $I_{BAT'}$ as soon as the activity of the circuitry 30 increases and the battery charge current $I_{CHG'}$ is reduced to zero, i.e., as soon as the play current $I_{SYS'}$ exceeds the maximum source current $I_{Smax'}$ able to be delivered by the DC power source 10'. The play current $I_{SYS'}$ will be then equal to the sum $(I_S+I_{BAT'})$ of the source and extra currents $I_{S'}$ and $I_{BAT'}$.

For clarity reasons, the description will be referred to the battery charge circuit 100 of FIG. 1a in the following. However, it is noted that this choice does not exclude the applicability of the description to the battery charge circuit 100' of FIG. 1a'. In FIG. 1b, the mechanism for charging Li-ion batteries is based on a constant current, constant voltage (CC-CV) charge mechanism. A pre-conditioning phase (phase I) begins the charging process generated by the battery charge circuit 100, also designated as battery charger, during which a low current $I_I$, also called pre-charge current, is applied by the DC power source 10 to the battery 20 being charged. As a result, the battery voltage $V_{BAT}$ applied at the terminal BAT gradually increases until a pre-conditioning voltage threshold $V_I$, also called battery conditioning level or minimum charge voltage level, is reached. At this point, a current regulation phase (phase II) starts wherein the charge current is increased to a constant regulation current level $I_{II}$, also called fast-charge current level, and the battery charge voltage continues to increase until reaching a predetermined voltage threshold $V_{EOC}$, also called maximum battery voltage, end-of-charge battery voltage or full-charge battery voltage. At this point, a voltage regulation phase (phase III) starts wherein a constant voltage (CV) is applied to the battery 20, and the current $I_{CHG}$ drawn by the battery 20 decays, while the battery 20 approaches its full charge, until reaching a predetermined minimum current level $I_{EOC}$, also called end-of-charge (EOC) current level. Charging process is then completed (phase IV). It should be noted that the levels of pre-charge current, fast-charge current, end-of-charge current, battery conditioning and maximum battery voltage may correspond to values either set or programmable.

Referring to FIG. 1b, the battery 20 is conventionally considered as fully charged when the battery charger 100 is in CV mode (phase III), i.e., when the battery 20 is regulated at a maximum voltage level $V_{EOC}$ and the battery charge current $I_{CHG}$ drops below the end-of-charge current level $I_{EOC}$. Sometimes, a third criterion is optionally introduced to give further information about the origin of the current decrease, and consists in taking into consideration the behavior of the die temperature regulation circuit of the charge FET corresponding to the first switching device 200. Thus, the inactive state of such a regulation circuit will indicate that the battery charge current $I_{CHG}$ is not decreased due to a too high charge FET thermal dissipation. In fact, most battery chargers do not take this criterion into account since, in CV mode, the voltage drop across the charge FET is rather small.

Nevertheless, all these criteria cannot always be sufficient to reliably determine the completion of the battery charging operation in a charge-and-play mode. Indeed, if the battery charge current $I_{CHG}$ decreases below the end-of-charge current $I_{EOC}$ upon battery charge completion, it may also drop below this current level at any other moment occurring within the CV mode. For example, $I_{CHG}$ can also decrease when the optional temperature regulation circuit of the charge FET corresponding to the first switching device 200 becomes active for avoiding any damage due to a too high power dissipation, or when the value of the maximum source current $I_{Smax}$ is lowered, or also when, the battery 20 being not in a fully charged state (i.e., $I_{CHG} \neq 0$), the current regulation circuit of the charge FET corresponding to the first switching device 200 becomes active as soon as the activity (or load) of the circuitry 30 increases and the total sum ($I_{CHG}+I_2$) of the currents $I_{CHG}$, charging the battery 20, and $I_2$ (where $I_2=I_{SYS}$ as long as the total sum is less than $I_{Smax}$), supplying the circuitry 30, reaches the value of the maximum source current $I_{Smax}$. This current limiter will then reduce $I_{CHG}$ to zero when the second current $I_2$ becomes greater than $I_{Smax}$. Thus, the battery 20 will behave as a generator in order to supply the circuitry 30 with the needed supplemental current $I_{BAT}$, whereas the current regulation circuit associated with the second switching device 210 will become active for limiting the second current $I_2$ to $I_{Smax}$.

Moreover, any excess of activity of the circuitry 30, above the DC power source capacity and during a sufficiently long time, may then lead to a full discharge of the battery 20 which is not charged any more by the battery charge current $I_{CHG}$ within this time interval. Without any extra current, the circuitry 30 will be forced to reduce and limit its activity to the only DC power source capacity through the activation of the current regulation circuit of the FET corresponding to the second switching device 210.

Furthermore, any excess of activity of the circuitry 30, which does not exceed the DC power source capacity may however lead to a limitation of the activity if the second current $I_2$ which passes through the second switching device 210 is large enough to generate overheating. This may happen when the DC power source capacity is particularly high. The current regulation circuit of the FET corresponding to the second switching device 210 will be then made active to decrease the second current $I_2$.

It is therefore an object of the present invention to provide a battery charge circuit in a charge-and-play mode capable to detect when a battery is reliably charged.

The invention is defined by the independent claims. Dependent claims define advantageous embodiments. Accordingly, a battery charge circuit operating in a charge-and-play mode comprises a terminal BAT at a voltage potential $V_{BAT}$ and to which a battery of a portable or mobile electronic device is connected, a first current sensor means for detecting the battery charge current $I_{CHG}$, a second current sensor means for detecting the play current $I_{SYS}$, and optionally a first temperature sensor means for detecting the temperature T1 of the charge FET corresponding to a first switching device. Thereby, the battery charge current and the parameters having an influence on its decrease are detected.

Furthermore, the detected parameters are fed to a first control unit, which controls the first switching device for being compared with current, voltage and optionally reference temperature levels. Thereby, the comparison results allow defining a battery end-of-charge condition.

These results are then outputted to a completion validation unit inside the first control unit. Thereby, the battery end-of-charge condition can be validated.

Additionally, the battery charge circuit operating in a charge-and-play mode may comprise a terminal SYS at a voltage potential $V_{SYS}$ and to which the circuitry of the device having the removable battery is connected, and a second temperature sensor means for detecting the temperature T2 of the FET corresponding to a second switching device. The parameters, such as the temperature T2 and the play current $I_{SYS}$, which give information about the activity of the circuitry can be thereby detected.

The detected temperature T2 is fed to a second control unit, which controls the second switching device for being compared with a reference temperature level. Thereby, an interrupt signal can be generated if T2 exceeds the reference level, such that the battery charge circuit is warned that the activity of the circuitry cannot be increased any more.

Moreover, the detected play current $I_{SYS}$ is also fed to the second control unit for being compared with a reference source current level. Thereby, a first interrupt signal can be generated if $I_{SYS}$ exceeds the reference current and a second one if $I_{SYS}$ is below the reference current, such that the time interval during which the battery charge current $I_{CHG}$ has been reduced to zero can be measured by activation and deactivation of a timer in response to both interrupt signals.

The present invention will be now described based on preferred embodiments with reference to the accompanying drawings in which:

FIG. 1a shows a conventional integrated battery charge circuit in a charge-and-play mode when USB powered;

FIG. 1a' shows a conventional battery charge circuit in a charge-and-play mode when wall adapter powered;

Figure 1A:
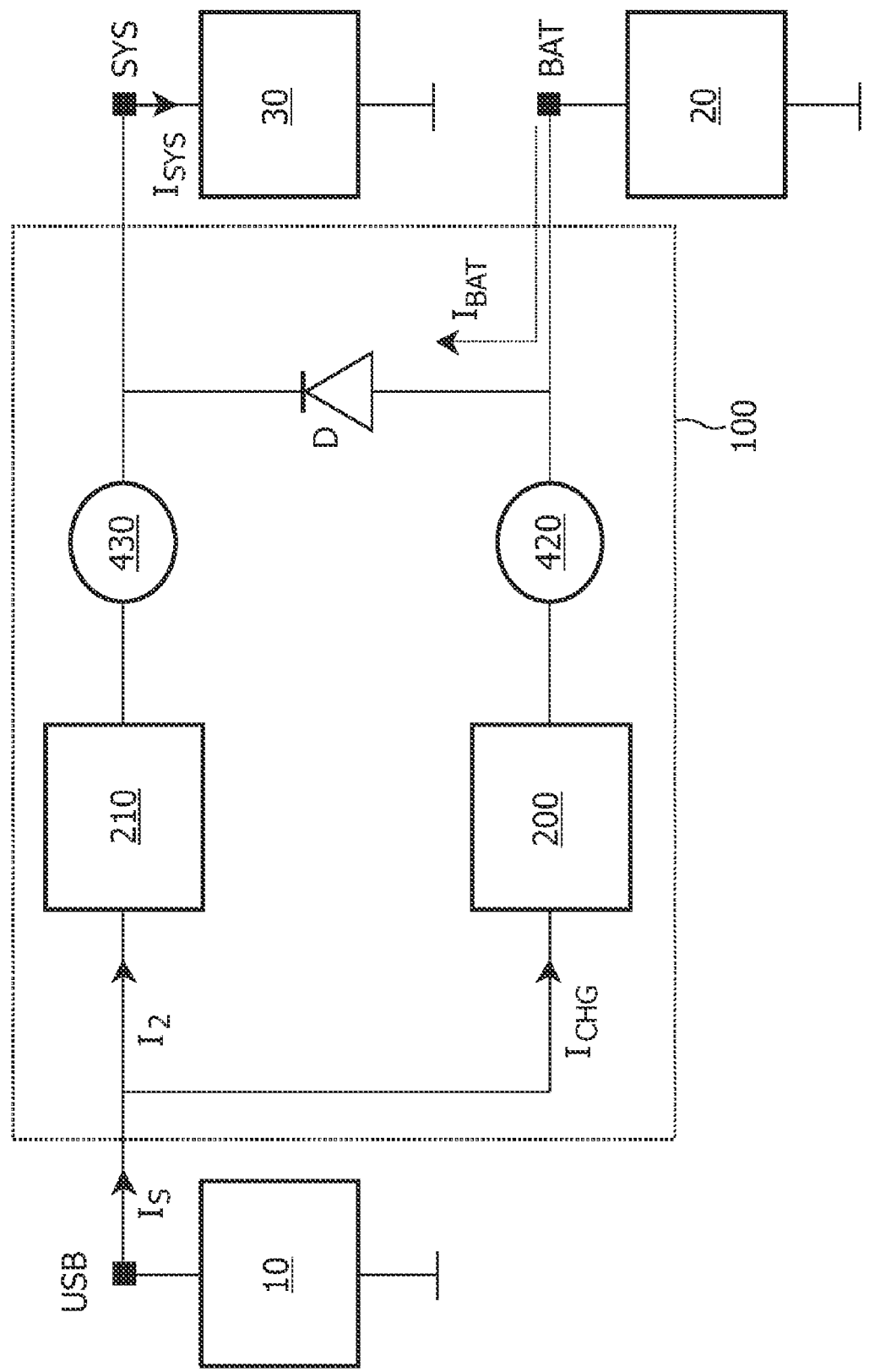
FIG. 1b shows the plots versus time of the battery voltage $V_{BAT}$ ($V_{BAT'}$) at the terminal BAT (BAT') and the corresponding battery charge current $I_{CHG}$ ($I_{CHG'}$), based on a conventional constant current constant voltage (CC-CV) charge mechanism.
Figure 1A:
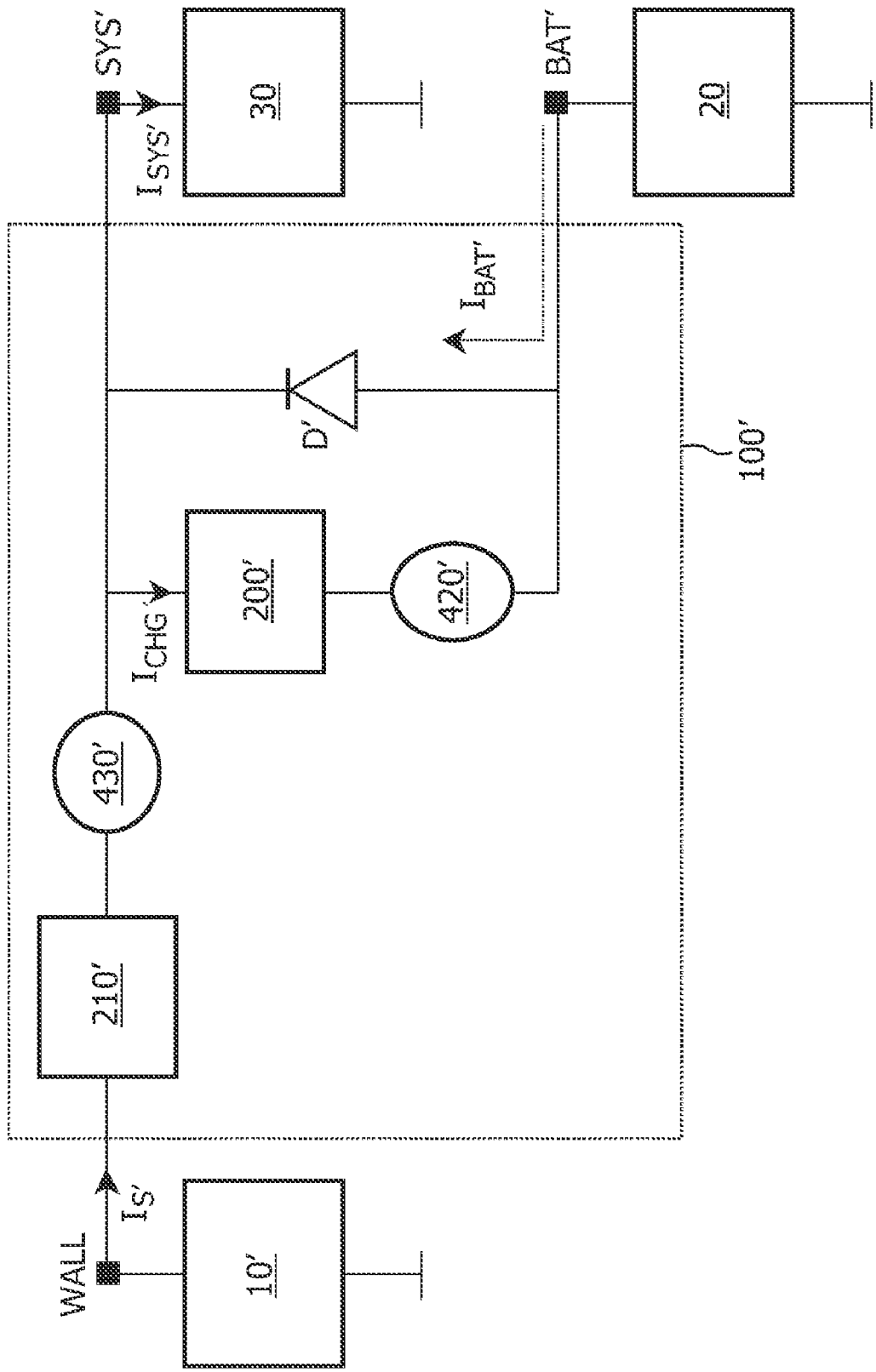
Figure 1B:
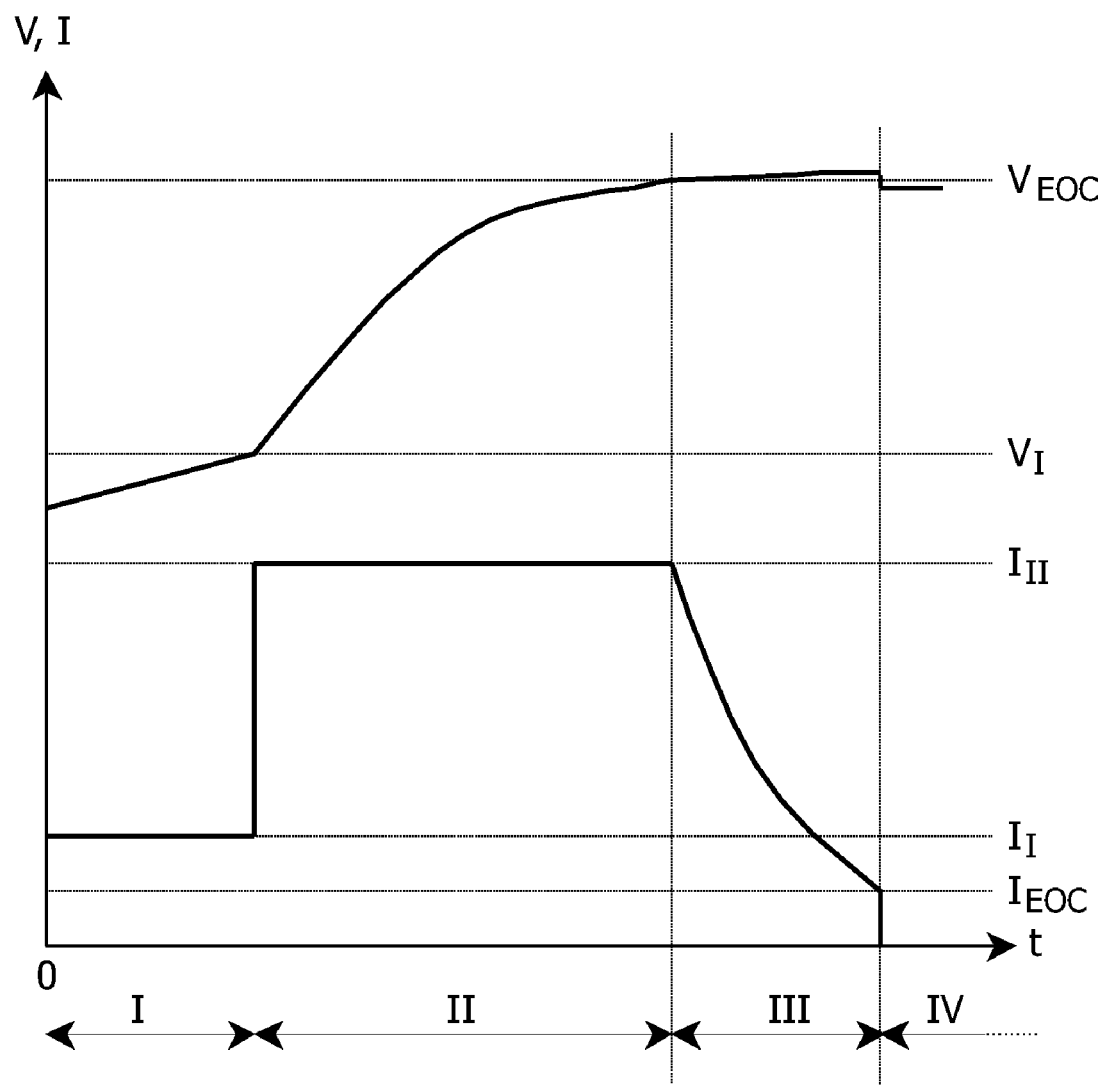
Figure 2:
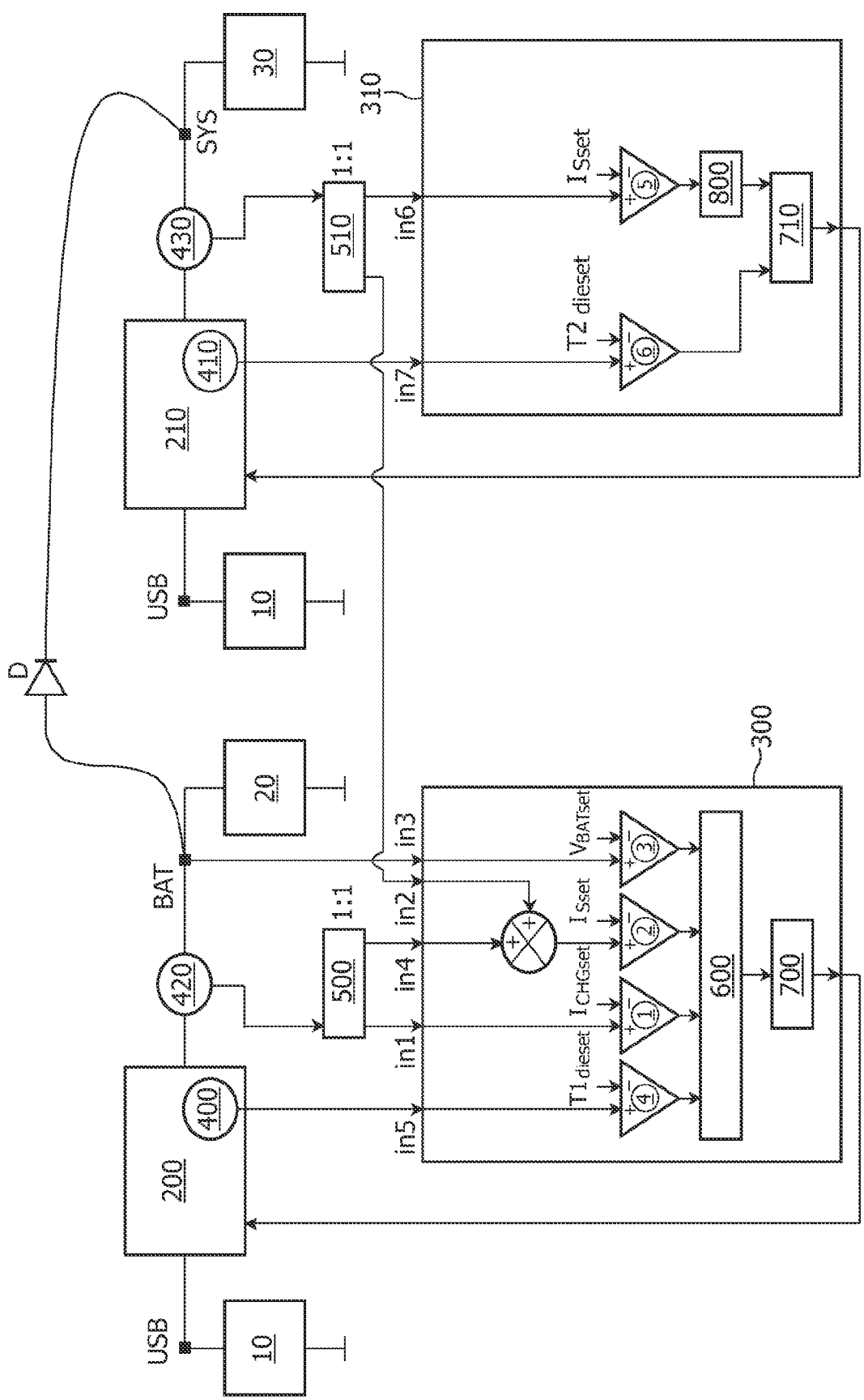
FIG. 2 shows a battery charge circuit in a charge-and-play mode according to the first preferred embodiment of the invention.

In the following, the first preferred embodiment will be described in connection with a battery charge circuit in a charge-and-play mode when USB powered, such as depicted in FIG. 2. In FIG. 2, the battery charge circuit in a charge-and-play mode according to the first preferred embodiment of the invention is based on the circuit from FIG. 1a, and includes a terminal USB to which a DC power source 10, such as USB supply, is connected, a terminal BAT to which a battery 20 of any portable and mobile electronic device is connected, a terminal SYS to which the corresponding removable circuitry 30 is connected, first and second switching devices 200, 210, such as controllable semiconductor switching devices, for regulating the respective battery and play currents $I_{BAT}$ and $I_{SYS}$, first and second control units 300, 310 for respectively controlling the first and second switching devices 200, 210, current sensors 420, 430, as well as optional temperature sensors 400, 410. The first temperature sensor 400 allows to detect a first temperature T1 of the first switching device 200, whereas the first current sensor 420 serves to detect the battery charge current $I_{CHG}$ passing through the first switching device 200. The detected battery charge current $I_{CHG}$ will be then replicated by being, for example, mirrored by a first current mirror 500 with a current mirror ratio of one. The second current sensor 430 enables to detect the second current $I_2$ which flows through the second switching device 210, and which is also equivalent to the play current $I_{SYS}$ as long as the diode D remains turned OFF. The detected second current $I_2$ (=play current $I_{SYS}$) will be then replicated by being, for example, mirrored by a second current mirror 510 with a current mirror ratio of one.

Each detected and replicated data will be fed to the multi input first control unit 300, such that the respective first and fourth inputs in1 and in4 have a current level identical to the battery charge current $I_{CHG}$, the second input in2 has a current level identical to the second current $I_2$ (=$I_{SYS}$), the third input in3 has a voltage level identical to the battery voltage $V_{BAT}$ while being electrically connected to the terminal BAT, and the fifth input in5 has a temperature level identical to the first temperature T1.

The first input in1 will be fed to the non-inverting input of a first comparator whose the inverting input is connected to a reference charge current $I_{CHGset}$ corresponding to the end-of-charge (EOC) current $I_{EOC}$ in a constant current constant voltage (CC-CV) charge mechanism. The second and fourth inputs in2 and in4 will be firstly added together, and the resulting current level $I_{CHG}+I_2$ (=$I_{CHG}+I_{SYS}$) will be then fed to the non-inverting input of a second comparator whose the inverting input is connected to a reference source current $I_{Sset}$ corresponding to the maximum source current level $I_{Smax}$ capable to be provided by the DC power source 10. The third input in3 will be fed to the non-inverting input of a third comparator whose the inverting input is connected to a reference voltage $V_{BAT}$ corresponding to the end-of-charge or full-charge voltage $V_{EOC}$ in a constant current constant voltage (CC-CV) charge mechanism. The fifth input in5 will be fed to the non-inverting input of a fourth comparator whose the inverting input is connected to a first reference temperature $T1_{dieset}$ corresponding to the maximum temperature level to be not exceeded by the first switching device 200 so as to avoid overheating and further damage. The output state of each comparator is dependent on comparison between each level of its inverting and non-inverting inputs. The output state will be HIGH when the level of the non-inverting input exceeds the level of the inverting input and LOW when the level of the inverting input exceeds the level of the non-inverting input. The output of each comparator will be supplied to a completion validation unit 600 whose output will then drive a first driver circuit 700 which controls the first switching device 200. Thus, the completion of the battery charging process will be reliably determined by the completion validation unit when the output state is LOW for the first ($I_{CHG} \leq I_{CHGset}$), second (($I_{CHG}+I_2) \leq I_{Sset}$) and fourth ($T1 \leq T1_{dieset}$) comparators and HIGH for the third ($V_{BAT} \geq V_{BATset}$) comparator, i.e., when the following Boolean relation is met: ($I_{CHG} \leq I_{CHGset}$) AND (($I_{CHG}+I_{SYS}) \leq I_{Sset}$) AND ($T1 \leq T1_{dieset}$) AND ($V_{BAT} \geq V_{BATset}$). Upon battery charge completion, the output of the completion validation unit will drive the first driver circuit 700 such that the first switching device 200 is turned OFF.

Furthermore, the second temperature sensor 410 allows to detect a second temperature T2 of the second switching device 210. The replicated second current $I_2$ and the second temperature T2 are then fed to the multi input second control unit 310, such that the sixth input in6 has a current level identical to the second current $I_2$ (=play current $I_{SYS}$) and the seventh input in7 has a temperature level identical to the second temperature T2. The sixth input in6 will be fed to the non-inverting input of a fifth comparator whose the inverting input is connected to the aforementioned reference source current $I_{Sset}$. The seventh input in7 will be fed to the non-inverting input of a sixth comparator whose the inverting input is connected to a second reference temperature $T2_{dieset}$ corresponding to the maximum temperature level to be not exceeded by the second switching device 210 so as to avoid overheating and further damage.

As previously, the output state will be HIGH when the level of the non-inverting input exceeds the level of the inverting input and LOW when the level of the inverting input exceeds the level of the non-inverting input. Thus, the output state of the fifth comparator will be HIGH as soon as the current regulation circuit of the FET corresponding to the second switching device 210 is made active, i.e., as soon as the current $I_2$ which circulates through the second switching device 210 exceeds the reference source current $I_{Sset}$ corresponding to the maximum source current level $I_{Smax}$. In this case, it makes sure that the battery charge current $I_{CHG}$ is already reduced to zero and that the second current $I_2$ corresponds to the source current $I_S$, the battery 20 starting to discharge through the diode D by providing the supplemental current $I_{BAT}$ to the circuitry 30. The battery charge current $I_{CHG}$ will return a non-zero value when the output state of the fifth comparator is LOW. As shown in FIG. 2, a timer 800 can also be coupled to the output of the fifth comparator in order to measure the time interval during which the battery charge current $I_{CHG}$ has been reduced to zero. The timer 800, such as a watchdog timer, will monitor the time during which the battery 20 is being charged and will be paused whenever the battery charge current $I_{CHG}$ becomes equal to zero. Thus, respective interrupt signals generated by the fifth comparator at each output state change can allow the timer 800 to go into and leave a pause mode, and by the same enable to warn the battery charger 100 that the battery 20 is being discharged. Additionally, the output state of the sixth comparator will be HIGH as soon as the die temperature regulation circuit of the FET corresponding to the second switching device 210 is made active, i.e., as soon as the temperature T2 reaches the maximum temperature level to be not exceeded by the second switching device 210 without any damage. Since Joule heating is generated when a current flows through a resistive element (e.g. FET resistor), the current regulation circuit of the FET corresponding to the second switching device 210 will become, in this case, active for limiting the second current $I_2$. Hence, the activity of the circuitry 30 will have to be reduced, and such an information will be communicated to the battery charger 100 after an interrupt signal is generated by the sixth comparator at each high-state of its output. Finally, the output of each fifth and sixth comparator will drive a second driver circuit 710 which controls the second switching device 210, such that it is regulated when both outputs are HIGH.

It is noted that the invention is not to be limited by the specific illustrated first embodiment of FIG. 2, wherein the first and second temperatures T1 and T2 may be identical and equal to the temperature of the die on which the battery charge circuit 100 is implemented, but may be used without any temperature regulation circuits. Moreover, the invention such as described according to the first preferred embodiment when USB powered can be easily extended to a second preferred embodiment when wall adapter powered.

In summary, a battery charge circuit 100 in a charge-and-play mode capable to reliably determine the completion of a battery charging operation has been described. Such a determination takes into account the behavior of the battery charge circuit 100 with respect to the temperature, the activity of the circuitry 30 and the source current limitation. Thus, a distinction can be made between a decrease of the battery charge current $I_{CHG}$ below the end-of-charge current level caused by the full-charge state of the battery 20 and by the activation of temperature and current regulation circuits. Furthermore, the battery charge circuit 100 is also configured such that it can be warned both that the activity of the circuitry 30 is to be limited and, by a timer 800 measuring the time interval during which the battery charge current $I_{CHG}$ has been reduced to zero, that the battery 20 is being discharged.

Finally but yet importantly, it is noted that the term "comprises" or "comprising" when used in the specification including the claims is intended to specify the presence of stated features, means, steps or components, but does not exclude the presence or addition of one or more other features, means, steps, components or group thereof. Further, the word "a" or "an" preceding an element in a claim does not exclude the presence of a plurality of such elements.

The invention claimed is:

1. A battery charge circuit configuration for operating a circuitry and simultaneously charging an associated battery separated from said circuitry comprising:
    a first switching means, said first switching means being passed through by a first current which is charging said battery;
    a first current sensor means, for detecting said first current;
    a second current sensor means, for detecting a second current, said second current supplying said circuitry;
    a first control unit, for controlling said first switching means, wherein said first control unit comprises:
    a first input, said first input being connected to said first current sensor means in order to have a current level identical to said first current;
    a second input, said second input being connected to said second current sensor means in order to have a current level identical to said second current;
    a third input, said third input being connected to a node to which said battery is connected in order to have a voltage level identical to a voltage level across said battery; and
    a fourth input, said fourth input having a current level which is a replica of said current level of said first input.

2. A battery charge circuit configuration according to claim 1, wherein:
    said current level of said first input is compared to a reference charge current;
    said second input and said fourth input are added together and the resulting current level corresponding to the summation is then compared to a reference source current; and
    said voltage level of said third input is compared to a reference voltage.

3. A battery charge circuit configuration according to claim 2, wherein:
    said reference charge current has a low current level corresponding to a end-of-charge current;
    said reference source current corresponds to a maximum current level capable to be provided by said power supply means; and
    said reference voltage has a high voltage level corresponding to a end-of-charge or full-charge voltage.

4. A battery charge circuit configuration according to claim 3, wherein said first control unit further comprises a completion validation unit, for determining whether said battery is fully charged, said completion determination being validated if each one of the following criteria is satisfied:
    said voltage level of said third input is greater than or equal to said reference voltage; and
    said current level of said first input is less than or equal to said reference charge current; and
    said resulting current level is less than or equal to said reference source current.

5. A battery charge circuit configuration according to claim 4, wherein said battery charge circuit configuration further comprises:
    a second switching means, said second switching means being passed through by said second current;
    a second control unit for controlling said second switching means, wherein said second control unit comprises at least:
    a sixth input, said sixth input having a current level which is a replica of said current level of said second input.

6. A battery charge circuit configuration according to claim 5, wherein:
    said sixth input is compared to said reference source current.

7. A battery charge circuit configuration according to claim 6, wherein said second control unit generates a sequence of interrupt signals comprising:
    a first interrupt signal, said first interrupt signal being generated when said current level of said sixth input is greater than or equal to said reference source current; and
    a second interrupt signal, said second interrupt signal being then generated when said current level of said sixth input is less than said reference source current.

8. A battery charge circuit configuration according to claim 7, wherein said second control unit further comprises a timer for measuring a time interval during which said first current has been reduced to zero, said timer being put in a pause mode by said first interrupt signal and leaving said pause mode by said second interrupt signal or inversely.

9. A battery charge circuit configuration according to claim 8, wherein any one of said first and second control units is a digital and analog controller means.

10. A battery charge circuit configuration according to claim 9, wherein said battery charge circuit configuration is an integrated circuit made from a single silicon implementation.

11. A battery charge circuit configuration according to claim 10, wherein said battery charge circuit configuration further comprises:
    a first temperature sensor means, for detecting a first temperature of said first switching means.

12. A battery charge circuit configuration according to claim 11, wherein said first control unit further comprises:
    a fifth input, said fifth input being connected to said first temperature sensor means in order to have a temperature level identical to said first temperature.

13. A battery charge circuit configuration according to claim 12, wherein said temperature level of said fifth input is compared to a first reference temperature.

14. A battery charge circuit configuration according to claim 13, wherein said first reference temperature corresponds to a maximum temperature level to be not exceeded by said first switching means.

15. A battery charge circuit configuration according to claim 14, wherein said completion determination by said completion validation unit is further validated if the following criteria is additionally satisfied:
    said temperature level of said fifth input is less than or equal to said first reference temperature.

16. A battery charge circuit configuration according to claim 15, wherein said second control unit further comprises:

a seventh input, said seventh input being connected to a second temperature sensor means in order to have a temperature level identical to a second temperature, said second temperature sensor means detecting a second temperature of said second switching means.

17. A battery charge circuit configuration according to claim 16, wherein:
said seventh input is compared to a second reference temperature.

18. A battery charge circuit configuration according to claim 17, wherein said second reference temperature has a maximum temperature level to be not exceeded by said second switching means.

19. A battery charge circuit configuration according to claim 18, wherein said second control unit generates a third interrupt signal for warning said battery charge circuit that a load of said circuitry cannot increase, said third interrupt signal being generated when said temperature level of said seventh input is greater than or equal to said second reference temperature.

20. A battery charge circuit configuration according to claim 15, wherein each one of said reference charge current, said reference source current, said first and second reference temperatures and said reference voltage, is a value set or programmable.

21. A battery charge circuit configuration according to claim 20, wherein said first and second reference temperatures are identical and equal to a temperature of a die on which said integrated circuit is implemented.

22. A detection method for detecting a battery end-of-charge condition in a battery charge circuit which operates a circuit and simultaneously charges an associated battery separated from said circuit, comprising at least the following steps:
detecting a voltage level across said battery being charged;
comparing said voltage level across said battery to a reference voltage;
detecting a first current, said first current charging said battery;
comparing said first current to a reference charge current;
detecting a second current, said second current supplying said circuitry;
adding together said first and second currents;
comparing the resulting current level corresponding to said summation to a reference source current.

23. A detection method for detecting a battery end-of-charge condition according to claim 22, wherein said method further comprises a step of:
validating said battery end-of-charge condition, said battery end-of-charge condition being validated when:
said voltage level across said battery is greater than or equal to said reference voltage; and
said first current is less than or equal to said reference charge current; and
said resulting current level is less than or equal to said reference source current.

24. A detection method for detecting a battery end-of-charge condition according to claim 23, wherein said method further comprises the steps of:
generating a first interrupt signal, said first interrupt signal being generated when said second current is greater than or equal to said reference source current;
generating a second interrupt signal, said second interrupt signal being generated after said first interrupt signal and when said second current is less than said reference source current.

25. A detection method for detecting a battery end-of-charge condition according to claim 24, wherein said method further comprises a step of:
measuring a time interval, said time interval starting from said generation of said first interrupt signal and ending with said generation of said second interrupt signal or inversely.

26. A detection method for detecting a battery end-of-charge condition according to claim 25, wherein said method further comprises the steps of:
detecting a first temperature, said first temperature being a temperature of a first switching means through which said first current flows;
comparing said first temperature to a first reference temperature.

27. A detection method for detecting a battery end-of-charge condition according to claim 26, wherein said method further comprises the steps of:
detecting a second temperature, said second temperature being a temperature of a second switching means through which said second current flows;
comparing said second temperature to a second reference temperature;
comparing said second current to said reference source current.

28. A detection method for detecting a battery end-of-charge condition according to claim 27, wherein said method further comprises a step of:
warning said battery charge circuit that a load of said circuitry cannot increase.

* * * * *